United States Patent
Scanlan et al.

(10) Patent No.: US 8,949,658 B1
(45) Date of Patent: Feb. 3, 2015

(54) LOAD BALANCER HOST SELECTION AND FAULT DETECTION

(75) Inventors: Brian A. Scanlan, Dublin (IE); Chris Higgins, Sammamish, WA (US)

(73) Assignee: Amazon Technologies, Inc., Reno, NV (US)

( * ) Notice: Subject to any disclaimer, the term of this patent is extended or adjusted under 35 U.S.C. 154(b) by 251 days.

(21) Appl. No.: 13/411,036

(22) Filed: Mar. 2, 2012

(51) Int. Cl.
 *G06F 11/00* (2006.01)
(52) U.S. Cl.
 USPC .......................................................... 714/4.2
(58) Field of Classification Search
 CPC ..... H04L 12/437; H04L 12/2422; H04L 1/22; G06F 11/2007; G06F 11/0793; G06F 11/08; G06F 11/20
 USPC .......................................................... 714/4.2
 See application file for complete search history.

(56) References Cited

U.S. PATENT DOCUMENTS

| | | |
|---|---|---|
| 8,005,644 B1 * | 8/2011 | Evans et al. ................... 702/183 |
| 2005/0102393 A1 * | 5/2005 | Murray et al. ................ 709/224 |
| 2006/0156299 A1 * | 7/2006 | Bondi et al. .................. 717/168 |
| 2011/0078303 A1 * | 3/2011 | Li et al. ......................... 709/224 |

* cited by examiner

*Primary Examiner* — Yair Leibovich
(74) *Attorney, Agent, or Firm* — Novak Druce Connolly Bove + Quigg LLP (57) ABSTRACT

In order to protect against various load balancing failures, the host selection algorithm on the load balancer can be modified to take into account data available about the state of the entire service and each host server in the cluster. The state can include a number of metrics, including the sampled response time taken by the selected host service. The load balancer can use the state information in order to detect anomalies among the host services. For example, the load balancer can determine that the sampled response time of one host service has deviated by more than a standard deviation limit (or other predetermined threshold) from the sampled response times of the other host services in the cluster. If such an anomaly is detected, the load balancer can take various remedial actions, such as disabling the routing of incoming requests to the potentially faulty host service.

26 Claims, 6 Drawing Sheets

LOAD BALANCER HOST SELECTION AND FAULT DETECTION

BACKGROUND

In network based environments, load balancers are used to distribute workload across multiple computers. This is often done in order to achieve optimal resource utilization, maximize throughput and avoid overload. In the context of a cluster network that serves client requests, a load balancer typically receives a request from a client and relays it to a particular backend server in the cluster responsible for processing that request and issuing a response. Load balancers can be implemented as hardware, software or some combination thereof and usually attempt to distribute the request load evenly across all of the servers in an effort to prevent any individual server in the cluster from being overloaded with requests.

There exist a number of host selection algorithms which load balancers use to determine which backend server to send the request to. Some of the simple algorithms include round-robin and random selection of hosts, while more sophisticated algorithms may consider other factors, such as how busy a server may be at the time of distributing the request and the like. For example, the least-connections algorithm may distribute the incoming request to the server having the fewest number of open connections or at least assign a higher preference to servers having fewer numbers of connections.

While load balancers generally serve their purpose well, certain situations may arise, where servers in the cluster malfunction, such as due to hardware or software faults, data corruption or other reasons. In certain cases, these malfunctions may affect the distribution of the processing load in a negative manner, causing various latencies, errors, dropped requests and other issues. For example, one particular problem involving the least-connections algorithm may occur when a backend server reaches a fast-fail state, but still appears on the surface to be legitimately processing requests. In that scenario, the faulty server appears to have the least number of connections because it is responding and closing connections very quickly albeit in an erroneous manner. As a result, the faulty server is routed more and more requests by the load balancer, thereby further exacerbating the problem. These, as well as various other load distribution errors and server malfunctions, can significantly impede the performance of the server network and the various resources therein.

BRIEF DESCRIPTION OF THE DRAWINGS

Various embodiments in accordance with the present disclosure will be described with reference to the drawings, in which.

DETAILED DESCRIPTION

In the following description, various embodiments will be illustrated by way of example and not by way of limitation in the figures of the accompanying drawings. References to various embodiments in this disclosure are not necessarily to the same embodiment, and such references mean at least one. While specific implementations and other details are discussed, it is to be understood that this is done for illustrative purposes only. A person skilled in the relevant art will recognize that other components and configurations may be used without departing from the scope and spirit of the claimed subject matter.

Systems and methods in accordance with various embodiments overcome the aforementioned and other deficiencies in existing approaches to load balancing of communication traffic. In particular, various embodiments provide approaches for improving the host selection algorithms in load balancers by determining when a particular host has deviated from the norm in some respect that may influence the processing of requests.

One of the problems to simple host selection algorithms in load balancing is that they may incorrectly select the wrong host in certain failure scenarios. For example, as previously mentioned, the "least connections" selection algorithm can fail if a host is in a fast-fail state (i.e. an error state in which the host responds very quickly but returns an incorrect or corrupted result). In such a scenario, the host appears to be completing the connections at a higher rate and therefore the host becomes more likely to be selected for service (due to the algorithm preferring the host with the fewest connections). This results in a proportionally worse failure, as more and more new requests can end up being processed by the host that is in error state.

In accordance with various embodiments described herein, to protect against this simple failure mode, the host selection algorithm on the load balancer can be modified to take into account the wide data available about the state of the entire service and this host. The data can be taken more than just at a single point in time, i.e. it can be spread over a recent set of data points. A number of techniques can be utilized to use statistical analysis of recent traffic, such as sampled response time averages (or weighted averages across the fleet), rate of change analysis, and the like.

As previously described, in a typical network environment, a load balancer is continuously receiving incoming requests and distributing them to a set of backend host servers or services for processing. The load balancer may use a number of host selection algorithms to select a host server or service for each incoming request, including but not limited to least connections algorithm, round robin algorithm, weighted round robin algorithm and others. When the host server receives the request, it processes the request and issues a response which can be relayed to the original requester.

In accordance with an embodiment, the load balancer can additionally maintain a set of state associated with the requests that were routed to the plurality of host services. The state can include a number of metrics, such as the sampled average response time taken by the host to issue a response to an incoming request that was routed to it by the load balancer. The load balancer can use the state information in order to detect anomalies in the response time taken by the backend host services. For example, the load balancer can determine that the sampled response time of one host has deviated by more than a standard deviation amount (or other predetermined threshold) from the response time for the other hosts in the cluster. If such an anomaly is detected, the load balancer can take various remedial actions, such as disabling the routing of incoming requests to the potentially faulty host service. Alternatively, the load balancer can log the anomaly to be reviewed by a network technician, take steps to actually shut down or restart the host service or perform other actions.

Figure 1:
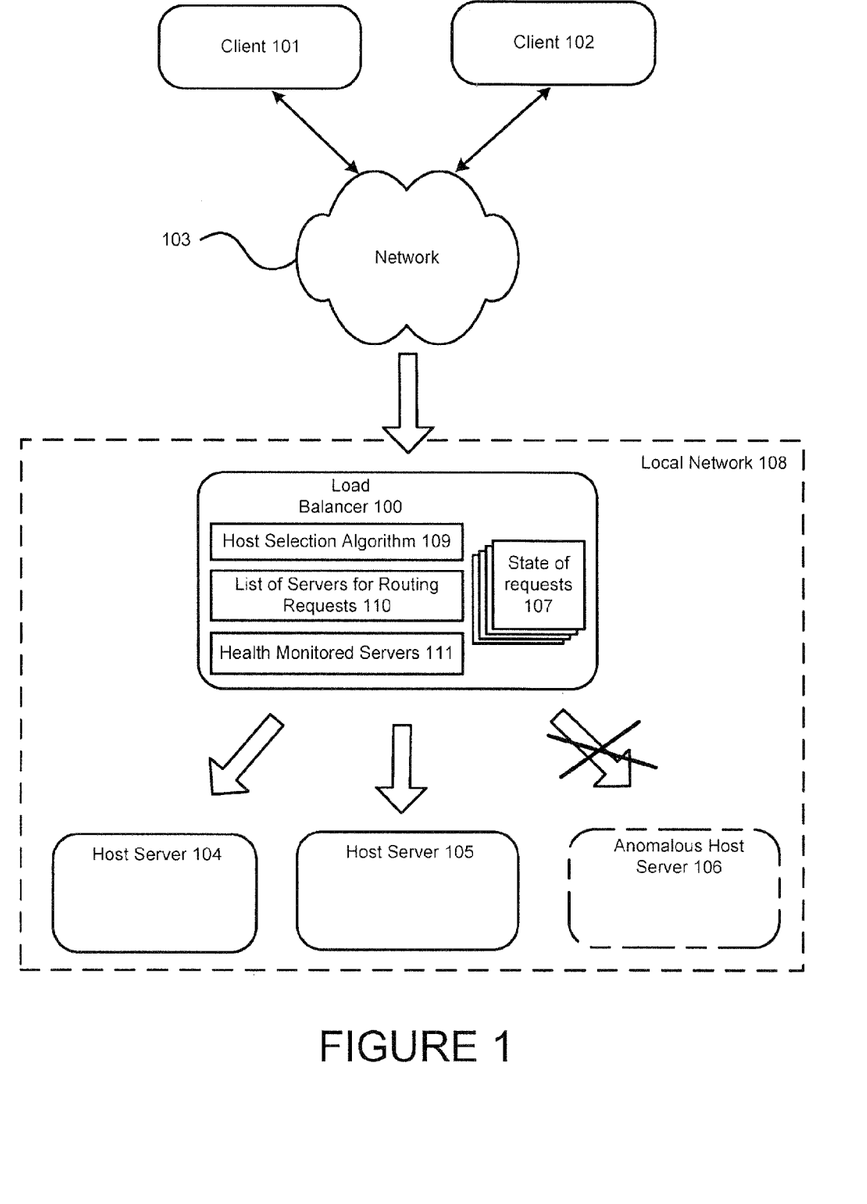
FIG. 1 illustrates an example of a load balancing environment where the algorithms for detecting host anomalies can be utilized, in accordance with various embodiments.

FIG. 1 illustrates an example of a load balancing environment where the algorithms for detecting host anomalies can be utilized, in accordance with various embodiments.

As illustrated, a load balancer 100 is typically used as an entry point for requests being received to a local area network (LAN) 108 from various clients (101, 102) on the network (e.g. Internet) 103. Once the load balancer receives the requests, it can distribute and balance the work load evenly across all of the available host backend host servers or services (104, 105, 106) that process the incoming requests. Conventionally, a load balancer maintains a list 110 of possible servers that it can send the request to and also maintains a list of servers 111 that it periodically checks the health of as a separate running process. The health checking can be implemented by having each backend server run a diagnostic check locally and report the outcome of that check to the load balancer. Based on this information maintained at the load balancer, the load balancer can utilize a host selection algorithm 109 to select a particular backend host to process the received request.

In various embodiments, the load balancer 100 can utilize any number of host selection algorithms 109, including but not limited to random, round-robin, weighted round-robin or least-connections algorithm. For example, if utilizing the round-robin algorithm, the load balancer can start with a host server and distribute each incoming request to the next host server in an incremental fashion until all of the hosts have received a request, at which point the load balancer can start over again. Round-robin ensures that every host server will be utilized and will eventually receive at least one request. If utilizing the least-connections algorithm, the load balancer can determine which of the available host servers has the fewest number of open connections and route the incoming request to that host on the assumption that it is the least busy.

Under certain circumstances, the health check process may fail and allow some types of faults to go undetected. For example, because the health check is typically executed on the host itself and then reported to the load balancer, it can be very difficult to implement an all-encompassing and all-detecting health check. As such, certain types of errors (e.g. chronic hardware malfunctions) may pass all health checks being executed on the host server, yet still significantly impact the processing of requests on that host server.

In accordance with an embodiment, to account for faults which have not been detected by a standard health check, the load balancer can maintain a set of state 107 associated with the incoming requests, outgoing responses, the entire service being provided by the hosts, information about each particular host and aggregate data across all of the hosts in the cluster. All of this state information can be tracked by the load balancer over specific time intervals and can be monitored for deviations from the norm. In accordance with various embodiments, the load balancer can perform statistical analysis of recent traffic, monitor response time averages, implement rate of change analyses and the like.

As illustrated in FIG. 1, the load balancer can use the state 107 to detect when one or more of the backend host servers have deviated from the norm in some predetermined way. For example, the load balancer can maintain a standard deviation limit for the monitored state values and flag alerts when one host server diverges from the other servers by more than the standard deviation limit. In accordance with an embodiment, when the load balancer detects such an anomaly, it can take remedial action, such as by adjusting the host selection algorithm to disable the routing of requests to the anomalous host server 106 entirely (as illustrated in the figure), logging the information to be reviewed by a network administrator, issuing alarms, changing the host selection algorithm (e.g. changing from least-connections to round-robin) and the like.

Figure 2:
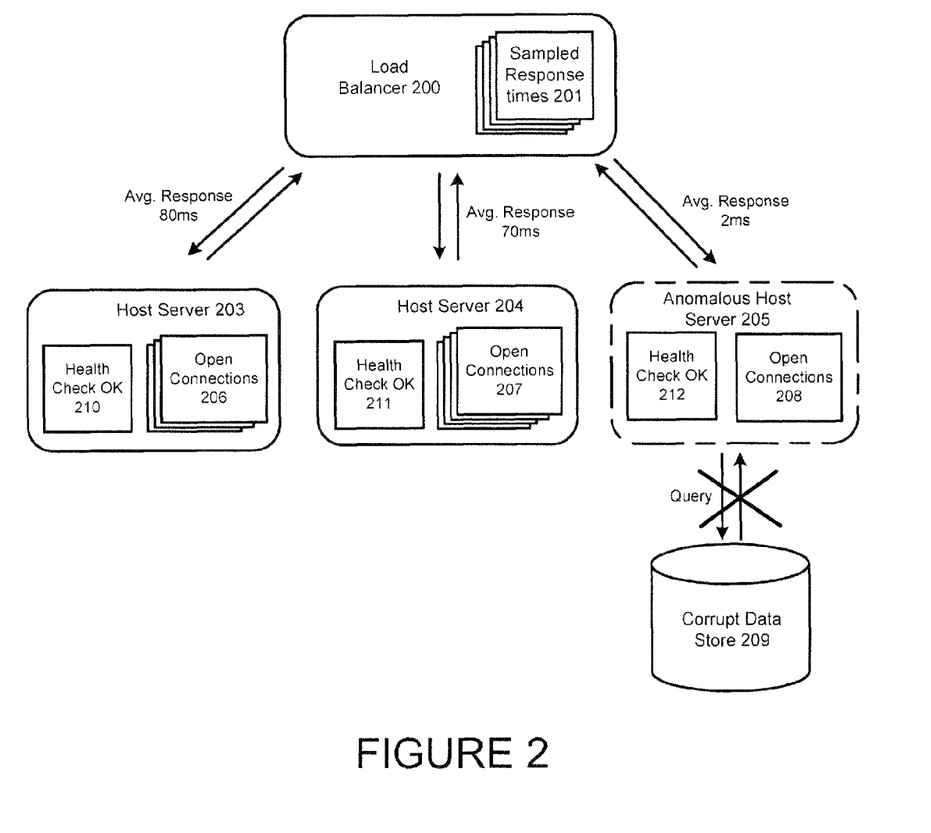
FIG. 2 illustrates an example of using sampled response time averages to detect an anomalous host server, in accordance with various embodiments.

FIG. 2 illustrates an example of using sampled response time averages to detect an anomalous host server, in accordance with various embodiments.

One popular algorithm that is used to distribute the requests from the load balancer 200 is the least-connections algorithm. Using this algorithm, the load balancer keeps track of the connections (206, 207, 208) that are open on each backend host server (203, 204, 205) and route the requests to the server having the fewest number of connections at the time of receiving the request. One possible failure in using this least-connections algorithm, however, occurs when one of the servers 205 enters a failure state where the host server 205 answers requests erroneously but these errors are not detected by any of the health checks (210, 211, 212). For example, as illustrated in FIG. 2, the host server may be required to query data from a database server 209, but that database server may be corrupted in some way. In that situation, the host server may answer positively to its own health check 212, but return an empty set of data to the client, and the load balancer 200 would continue to send requests to the server 205. Under these failure conditions, the host server may answer the request and close the connection very quickly because it is not actually performing the data query and is instead simply returning the empty set of data. As such, this host server appears to have very few open connections at any given moment in time. Consequently, if the load balancer is using the least-connections algorithm, it will continue to send more and more requests to the faulty server, causing significant impact to the clients.

As one possible solution to this problem, the load balancer 200 can keep track of the response times 201 of the backend host servers (203, 204, 205). For example, the load balancer may keep track of the time that it takes for the host server to respond initially to each request that was routed to it (i.e. time taken for the response to start). In addition, the load balancer can sample the response time for each host server over a defined time interval and compare them to each other. For example, the load balancer can compute a standard deviation limit based on all of the sampled response times, where any deviation from the average by more than the set limit may indicate a problem.

In accordance with an embodiment, the load balancer can use the response times to apply an algorithm that can detect anomalies among the host servers. For example, as illustrated in FIG. 2, one anomaly that can be detected by using the response times is a situation when a host server begins to respond immediately with an empty set of data or some other error. In this situation, the sampled average response time for the anomalous server 205 can drop to a significantly lower duration, such as 2 milliseconds (ms) versus an average 70-80 ms taken by other host servers to process the request. If the standard deviation limit used by the load balancer is 30 ms, the server having a 2 ms response time would be flagged by the load balancer as exceeding the deviation limit. At the same time, if the other servers have not deviated from the sampled average response time by more than the standard deviation limit, the load balancer can determine that the host server with the 2 ms response time is behaving abnormally and the load balancer can flag the host server or suspend routing requests to it. It may be useful to check whether a significant subset of the servers is exceeding the standard deviation limit because there may be some event that has caused the response times to change across the entire cluster, such as the addition of new servers, change of software or some other event. For example, a new software upgrade may be in the process of being rolled out across all the servers which causes the response times to drop significantly. Due to such a software change, a large portion of hosts may begin behaving anomalously and yet it may be undesirable to suspend any of the servers. By comparing the host that has deviated from the sampled average response time to other hosts at the same time period, a more accurate picture of the anomaly can be gathered and more appropriate actions can be taken.

In accordance with an embodiment, when the load balancer notices that a host server has deviated outside of the typical range of response time, it may or may not suspend routing requests to it. In alternative embodiments, the load balancer may require that the host remains outside of the standard deviation for at least a predefined period of time, a number of time intervals, or consecutive cycles of the response time check before it can be considered to be behaving abnormally.

In accordance with an embodiment, each host (203, 204, 205) on the network can be in any one of at least three states: (1) an active and healthy state; (2) a health check failed state, where the host is taken offline from receiving requests; and (3) a health check passed but anomalous state, where the host is deemed to be behaving abnormally and has been disabled from receiving requests by the load balancer.

In accordance with an embodiment, it may be useful to prevent too many host servers from being disabled due to unforeseen circumstances. As such, the load balancer may include a limit for how many host servers can be disabled due to the detected anomalies. Once that limit is reached, the load balancer may cease disabling any more servers and instead simply log information about the anomalies as they are detected.

In this manner, the statistical analysis can be performed for average response times over a period of time and this analysis can be used to influence the host selection algorithm utilized by the load balancer. It should be noted, however, that although the load balancer in FIG. 2 utilizes a least-connections algorithm, not all of the embodiments described in this disclosure are limited to this particular host selection algorithm. The techniques described herein are also applicable to a number of various algorithms and means for selecting a host, which fall within the scope of the various embodiments.

Figure 3:
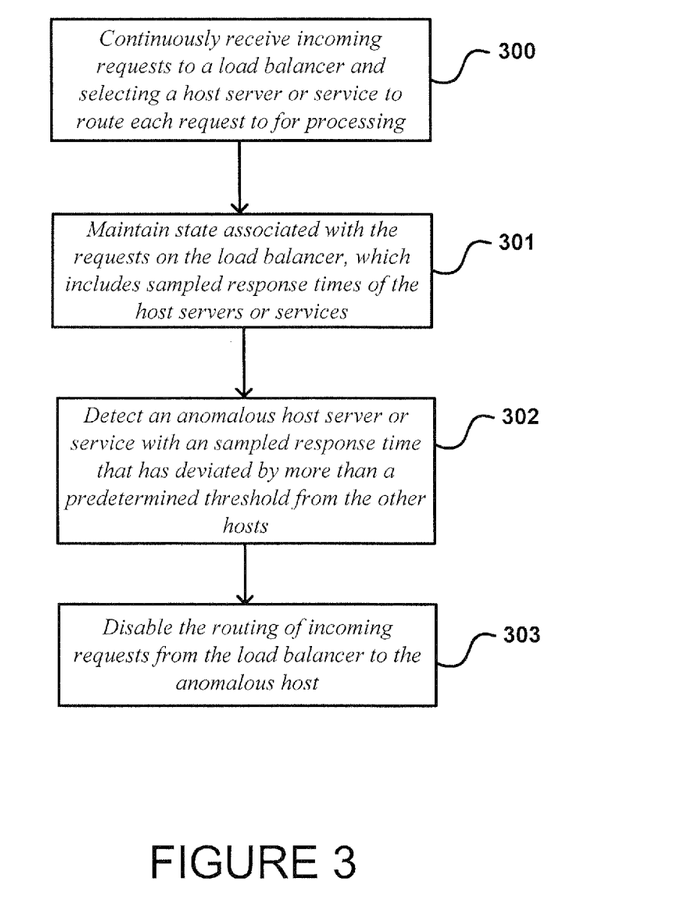
FIG. 3 illustrates an example process for detecting anomalies in load balancer host selection, in accordance with various embodiments.

FIG. 3 illustrates an example process for detecting anomalies in load balancer host selection, in accordance with various embodiments. Although this figure, as well as any other process illustrations contained in this disclosure may depict functional steps in a particular sequence, the processes are not necessarily limited to the particular order or steps illustrated. One skilled in the art will appreciate that the various steps portrayed in this or other figures can be changed, rearranged, performed in parallel or adapted in various ways. Furthermore, it is to be understood that certain steps or sequences of steps can be added to or omitted from the process, without departing from the scope of the various embodiments.

As shown in step 300, the load balancer can be continuously receiving incoming requests from external clients. Upon receiving the request, the load balancer employs a host selection algorithm to select one of the multiple backend host servers to handle the request. The load balancer then routes the request to the selected host server, where the host server processes the request assigned to it and issues a response.

As shown in step 301, the load balancer can also maintain a set of state associated with the incoming requests routed to the servers. The set of state may include a number of metrics, including sampled average response times taken by the host servers to initiate responses to the incoming requests, information about the entire service being provided by the host servers, information about each particular host and aggregate data across all of the hosts in the cluster. For example, the load balancer may periodically sample response time taken for a host service to initiate a response to the request and keep track of that statistic about each host. Alternatively, the load balancer may keep track, of the number of hypertext transfer protocol (HTTP) error codes issued by the host servers or services and store those statistics as the state of the requests.

In step 302, the load balancer can use the state information (e.g. the sampled response time) to detect any host server that is behaving anomalously. For example, if a server has an average response time that has deviated by more than a predetermined threshold from the average response times for other host servers in the cluster, the load balancer can flag the server as being outside of the norm of the remaining host servers.

In step 303, the load balancer can perform a remedial action in response to detecting the anomaly. For example, the load balancer may alter the host selection algorithm to disable the detected server from receiving any more requests. Alternatively, the load balancer may simply log information about the anomaly into a log file to be reviewed by a network administrator. As another example, the load balancer may drop the anomalous server from one host selection algorithm to another (e.g. begin routing requests to the server in a round-robin manner versus least-connection). Various other remedial actions can be performed as will be evident to one of ordinary skill in the art based on the teachings of the present disclosure.

Figure 4:
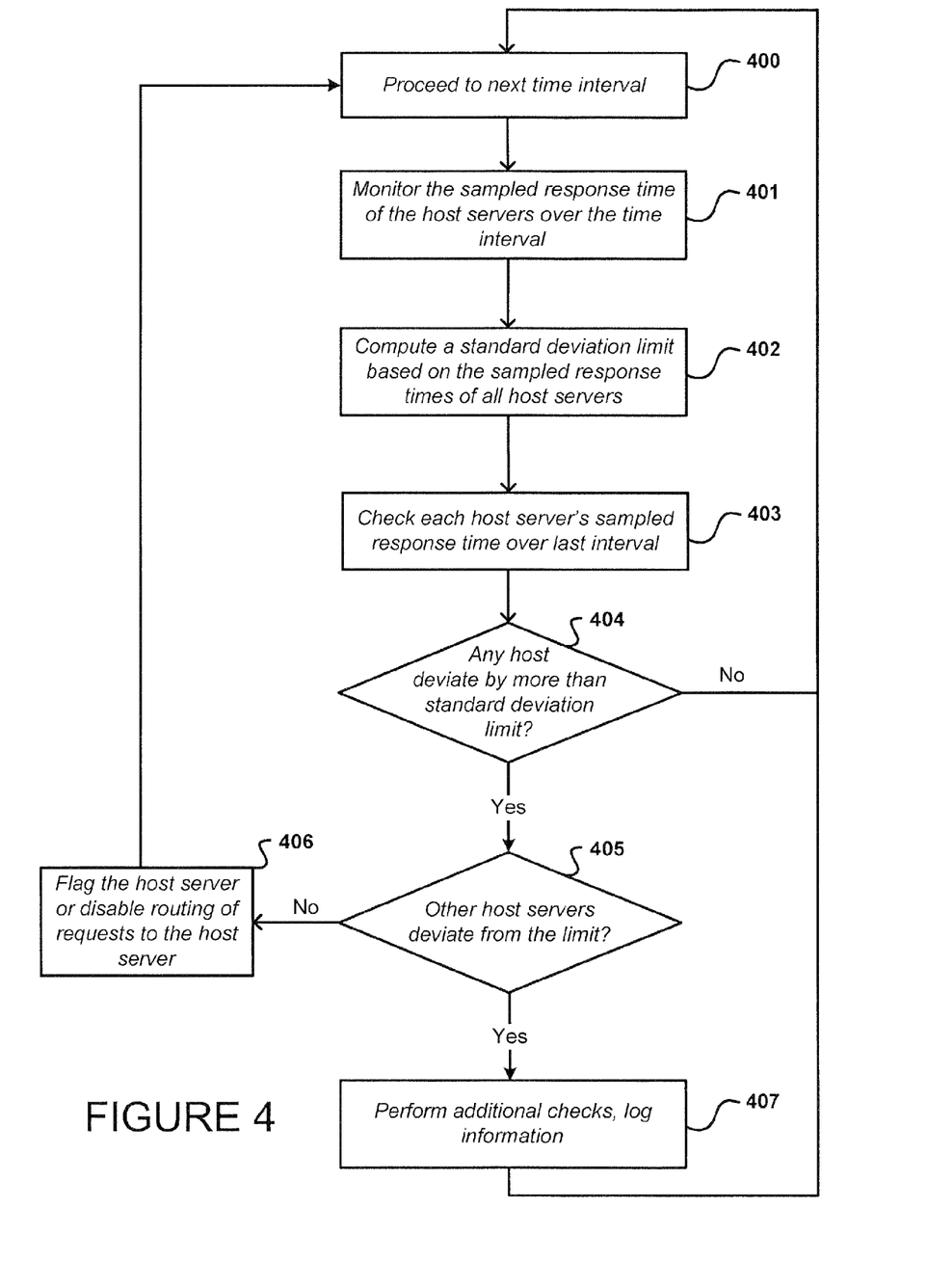
FIG. 4 is an example logical flow diagram for oad balancer anomalous server detection, in accordance with various embodiments.

FIG. 4 is an example logical flow diagram for load balancer anomalous server detection, in accordance with various embodiments. The process illustrated in FIG. 4 can be performed for each of a plurality of time intervals (step 400) that have predetermined by the load balancing algorithm. For each time interval, the load balancer can monitor and periodically sample the response time of the host servers over the time interval, as shown in step 401. In step 402, the load balancer can additionally compute a standard deviation limit based on the average response times of all host servers. In step 403, the load balancer checks each host server's sampled average response time over the present time interval. If no host deviates from the average by more than standard deviation limit (step 404), the load balancer need not perform any additional actions, and the process can continue to the next time interval (step 400).

If at least one server is determined to have deviated from the norm, the load balancer can check whether there are other host servers that have also deviated from the norm, as shown in step 405. If there are no other servers that have done so, the server can be considered to be behaving in an anomalous manner and can be flagged or disabled from receiving any further requests, as shown in step 406. If on the other hand, other servers have also deviated from the sampled average by more than the standard deviation limit, additional actions can be performed (step 407), such as alerting the network technician, logging the information, waiting until more time intervals have passed before taking any remedial action, and the like.

Figure 5:
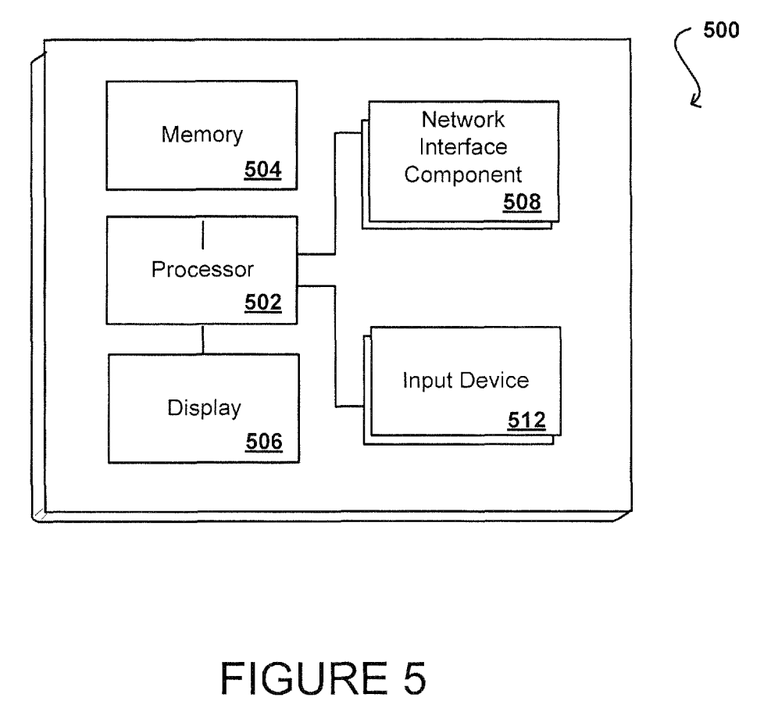
FIG. 5 illustrates a logical arrangement of a set of general components of an example computing device that can be used in accordance with various embodiments.

FIG. 5 illustrates a logical arrangement of a set of general components of an example computing device 500. In this example, the device includes a processor 502 for executing instructions that can be stored in a memory device or element 504. As would be apparent to one of ordinary skill in the art, the device can include many types of memory, data storage, or non-transitory computer-readable storage media, such as a first data storage for program instructions for execution by the processor 502, a separate storage for images or data, a removable memory for sharing information with other devices, etc. The device typically will include some type of display element 506, such as a touch screen or liquid crystal display (LCD), although devices such as portable media players might convey information via other means, such as through audio speakers. As discussed, the device in many embodiments will include at least one input element 508 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device. In some embodiments, the computing device 500 of FIG. 5 can include one or more network interface elements 508 for communicating over various networks, such as a Wi-Fi, Bluetooth, RF, wired, or wireless communication systems. The device in many embodiments can communicate with a network, such as the Internet, and may be able to communicate with other such devices.

Figure 6:
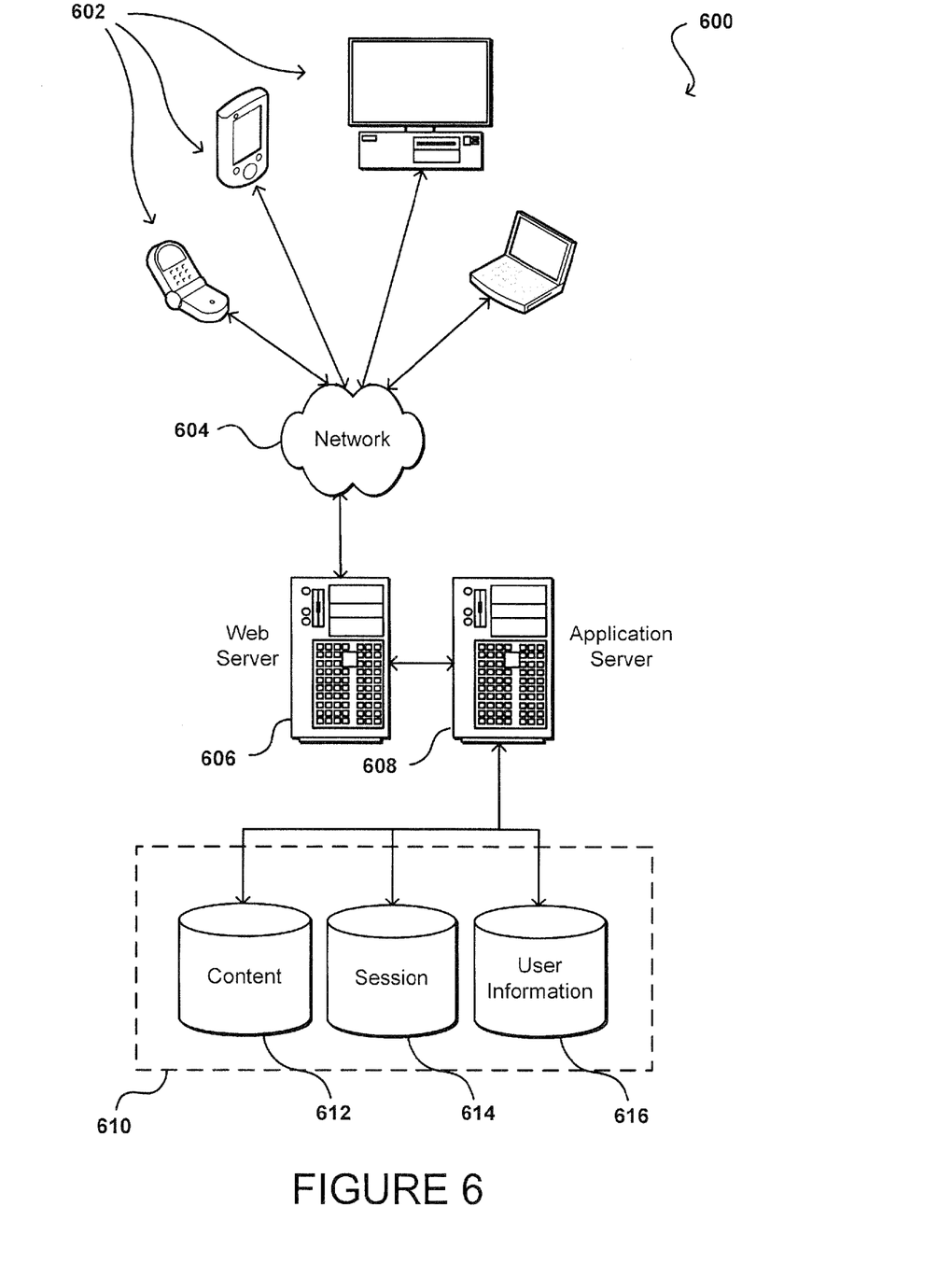
FIG. 6 illustrates an example of an environment for implementing aspects in accordance with various embodiments.

As discussed, different approaches can be implemented in various environments in accordance with the described embodiments. For example, FIG. 6 illustrates an example of an environment 600 for implementing aspects in accordance with various embodiments. As will be appreciated, although a Web-based environment is used for purposes of explanation, different environments may be used, as appropriate, to implement various embodiments. The system includes an electronic client device 602, which can include any appropriate device operable to send and receive requests, messages or information over an appropriate network 604 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 606 for receiving requests and serving content in response thereto, although for other networks an alternative device serving a similar purpose could be used, as would be apparent to one of ordinary skill in the art.

The illustrative environment includes at least one application server 608 and a data store 610. It should be understood that there can be several application servers, layers or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 602 and the application server 608, can be handled by the Web server 606. It should be understood that the Web and application servers are not required and are merely example components, as structured code discussed herein can be executed on any appropriate device or host machine as discussed elsewhere herein.

The data store 610 can include several separate data tables, databases or other data storage mechanisms and media for storing data relating to a particular aspect. For example, the data store illustrated includes mechanisms for storing production data 612 and user information 616, which can be used to serve content for the production side. The data store also is shown to include a mechanism for storing log or session data 614. It should be understood that there can be many other aspects that may need to be stored in the data store, such as page image information and access rights information, which can be stored in any of the above listed mechanisms as appropriate or in additional mechanisms in the data store 610. The data store 610 is operable, through logic associated therewith, to receive instructions from the application server 608 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 602. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 6. Thus, the depiction of the system 600 in FIG. 6 should be taken as being illustrative in nature and not limiting to the scope of the disclosure.

Various embodiments discussed or suggested herein can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIPS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method for protecting against failures in load balancer host selection, said method comprising:
   under the control of one or more computer systems configured with executable instructions,
      receiving incoming requests to at least one load balancer, the load balancer selecting at least one of a plurality of services for each of the incoming requests and routing the request to the selected service, the selected service processing the incoming request and issuing a response;
      maintaining, by the load balancer, a set of states associated with the incoming requests routed to the plurality of services, the set of states including at least sampled response times taken by the services to initiate responses to the incoming requests as measured by the load balancer;
      detecting an anomalous service having an sampled response time that has deviated by more than a predetermined threshold from the sampled response times for other services in the plurality of services, wherein detecting the anomalous service further includes determining that the sampled response time for the anomalous service is shorter in duration than the sampled response times for the other services by more than a predetermined threshold; and disabling the routing of incoming requests from the load balancer to the anomalous service.

2. The method of claim 1, wherein detecting the anomalous service further includes:

detecting that the sampled response time for the anomalous service has deviated by more than a predetermined threshold from the sampled response time of the other services for a specified period of time.

3. The method of claim 1, wherein the load balancer selects at least one of a plurality of services for each of the incoming requests according to a least connections algorithm, wherein the load balancer measures which of the plurality of services has the fewest number of open connections and routes the incoming request the service having the fewest number of open connections.

4. The method of claim 1, wherein the load balancer maintains a health check for the plurality of services by periodically receiving health information reported by each service, and wherein upon detecting the anomalous service, the load balancer disables routing the incoming requests to the anomalous service even if the anomalous server has passed the health check.

5. The method of claim 1, wherein the set of states associated with the incoming requests is maintained on a plurality of distributed load balancers, each load balancer receiving incoming requests and routing the requests to the plurality of services.

6. A computer-implemented method for distributing processing load, said method comprising:

under the control of one or more computer systems configured with executable instructions, distributing a set of requests from a load balancer to a plurality of services for processing the requests;

monitoring a state of the requests being processed by the plurality of services by a load balancer over a specified time interval;

determining that at least one service in the plurality of services has deviated from remaining services in the plurality of services with respect to the state being monitored by the load balancer over the specified time interval, wherein determining that the at least one service in the plurality of services has deviated further includes determining that a sampled response time for the at least one service is shorter in duration than sampled response times for other services; and suspending the distribution of the requests from the load balancer to the service that has deviated from the remaining services.

7. The method of claim 6, wherein monitoring the state of the requests further includes the load balancer maintaining a standard deviation limit for response times to the requests for all of the plurality of services over the time interval.

8. The method of claim 7, wherein determining that the at least one service has deviated from the remaining services further includes the load balancer:

detecting that a response time for the at least one service has exceeded the standard deviation limit while the response times for the remaining services have not exceeded the standard deviation limit; and suspending the distribution of the requests to the at least one service in response to detecting that the response time for the at least one service has exceeded the standard deviation limit.

9. The method of claim 7, wherein determining that at least one service in the plurality of services has deviated from the remaining services further includes:

reading a configuration file by the load balancer; and determining, by the load balancer based on the configuration file, that the at least one service has remained outside of the standard deviation limit for at least one of: a predefined period of time, a number of time intervals, or a number of consecutive cycles of monitoring the state of the requests.

10. The method of claim 6, wherein the load balancer maintains a health check for the plurality of services by periodically receiving health information reported by each service, and wherein upon determining that the at least one service in the plurality of services has deviated from the remaining services, the load balancer disables routing the requests to the at least one service even if the at least one service has passed the health check.

11. The method of claim 10, wherein each of the plurality of services is in one of at least three states: (a) an active state, wherein the service is receiving request and passed the health check; (2) a health check failed state, wherein the service is taken offline from receiving requests; and (3) a health check passed but anomalous state, wherein the service is deemed to be behaving abnormally and is disabled from receiving requests by the load balancer.

12. The method of claim 6, wherein the load balancer selects at least one of the plurality of services for each of the requests according to a least-connections algorithm, wherein the load balancer measures which of the plurality of services has the fewest number of open connections and routes the request the service having the fewest number of open connections.

13. A computing device, comprising:

a processor; and memory including instructions that, when executed by the processor, cause the computing device to:

receive a set of requests by a load balancer and route each of the set of requests to at least one of a plurality of services for processing;

record, by the load balancer, a state of the requests being processed by the plurality of services over a specified time interval;

determine that at least one service in the plurality of services has deviated from remaining services in the plurality of services with respect to the state being monitored by more than a predetermined threshold amount, wherein to determine that the at least one service in the plurality of services has deviated further includes determining that a sampled response time for the at least one service is shorter in duration than sampled response times for the remaining services; and flag the service that has deviated from the remaining services as behaving abnormally.

14. The computing device of claim 13, wherein the load balancer further includes a configuration file that stores instructions that specify at least one action to perform once the load balancer determines that the at least one service has deviated from the remaining services, and wherein the action includes at least one of: disabling routing of requests to the at least one service, logging information about the deviation in a log file, or generating an alarm.

15. The computing device of claim 13, wherein recording the state of the requests further includes the load balancer recording a standard deviation limit for response times to the requests for all of the plurality of services over the time interval.

16. The computing device of claim 15, wherein determining that the at least one service has deviated from the remaining services further includes the load balancer:
   detecting that a response time for the at least one service has exceeded the standard deviation limit while the response times for the remaining services have not exceeded the standard deviation limit; and
   suspending the distribution of the requests to the at least one service in response to detecting that the response time for the at least one service has exceeded the standard deviation limit.

17. The computing device of claim 15, wherein determining that at least one service in the plurality of services has deviated from the remaining services further includes:
   determining, by the load balancer, that the at least one service has remained outside of the standard deviation limit for at least one of: a predefined period of time, a number of time intervals, or a number of consecutive cycles of monitoring the state of the requests.

18. The computing device of claim 13, wherein the load balancer maintains a health check for the plurality of services by periodically receiving health information reported by each service, and wherein upon determining that the at least one service in the plurality of services has deviated from the remaining services, the load balancer disables routing the requests to the at least one service even if the at least one service has passed the health check.

19. The computing device of claim 18, wherein each of the plurality of services is in one of at least three states: (a) an active state, wherein the service is receiving request and passed the health check; (2) a health check failed state, wherein the service is taken offline from receiving requests; and (3) a health check passed but anomalous state, wherein the service is deemed to be behaving abnormally and is disabled from receiving requests by the load balancer.

20. The computing device of claim 13, wherein the load balancer selects at least one of the plurality of services for each of the requests according to a least-connections algorithm, wherein the load balancer measures which of the plurality of services has the fewest number of open connections and routes the request the service having the fewest number of open connections.

21. A non-transitory computer readable storage medium storing a set of instructions, the instructions when executed by one or more hardware processors, causing the one or more hardware processors to perform a set of steps comprising:
   distributing a set of requests from a load balancer to a plurality of services for processing the requests;
   maintaining a state of the requests being processed by the plurality of services by a load balancer over a specified time interval;
   detecting that at least one service in the plurality of services has deviated, by more than a predetermined threshold, from remaining services in the plurality of services with respect to the state being monitored by the load balancer, wherein detecting that the at least one service in the plurality of services has deviated further includes determining that a sampled response time for the at least one service is shorter in duration than sampled response times for the remaining services; and
   disabling the distribution of the requests from the load balancer to the service that has deviated from the remaining services.

22. The non-transitory computer readable storage medium of claim 21, wherein maintaining the state of the requests further includes the load balancer maintaining a standard deviation limit for response times to the requests for all of the plurality of services over the time interval.

23. The non-transitory computer readable storage medium of claim 22, wherein detecting that the at least one service has deviated from the remaining services further includes the load balancer:
   detecting that a response time for the at least one service has exceeded the standard deviation limit while the response times for the remaining services have not exceeded the standard deviation limit; and
   suspending the distribution of the requests to the at least one service in response to detecting that the response time for the at least one service has exceeded the standard deviation limit.

24. The non-transitory computer readable storage medium of claim 22, wherein detecting that at least one service in the plurality of services has deviated from the remaining services further includes:
   determining, by the load balancer, that the at least one service has remained outside of the standard deviation limit for at least one of: a predefined period of time, a number of time intervals, or a number of consecutive cycles of monitoring the state of the requests.

25. The non-transitory computer readable storage medium of claim 21, wherein the load balancer maintains a health check for the plurality of services by periodically receiving health information reported by each service, and wherein upon detecting that the at least one service in the plurality of services has deviated from the remaining services, the load balancer disables routing the requests to the at least one service even if the at least one service has passed the health check.

26. The non-transitory computer readable storage medium of claim 25, wherein each of the plurality of services is in one of at least three states: (a) an active state, wherein the service is receiving request and passed the health check; (2) a health check failed state, wherein the service is taken offline from receiving requests; and (3) a health check passed but anomalous state, wherein the service is deemed to be behaving abnormally and is disabled from receiving requests by the load balancer.

* * * * *